United States Patent [19]

Tennent

[11] Patent Number: 4,663,230

[45] Date of Patent: May 5, 1987

[54] CARBON FIBRILS, METHOD FOR PRODUCING SAME AND COMPOSITIONS CONTAINING SAME

[75] Inventor: Howard G. Tennent, Kennett Square, Pa.

[73] Assignee: Hyperion Catalysis International, Inc., Andover, Mass.

[21] Appl. No.: 678,701

[22] Filed: Dec. 6, 1984

[51] Int. Cl.$^4$ ............................................. B32B 9/00
[52] U.S. Cl. ................................. 428/367; 427/216; 427/249; 427/255.1; 428/376; 428/398; 428/408
[58] Field of Search .................. 427/216, 249, 255.1; 428/367, 376, 398, 408

[56] References Cited

U.S. PATENT DOCUMENTS

| | | | |
|---|---|---|---|
| 4,397,901 | 8/1983 | Warren | 427/249 |
| 4,472,454 | 9/1984 | Houdayer et al. | 427/249 |

*Primary Examiner*—William J. Van Balen
*Attorney, Agent, or Firm*—John P. White

[57] ABSTRACT

This invention concerns an essentially cylindrical discrete carbon fibril characterized by a substantially constant diameter between about 3.5 and about 70 nanometers, e.g. between about 7 and 25 nanometers, length greater than about $10^2$ times the diameter, an outer region of multiple essentially continuous layers of ordered carbon atoms and a distinct inner core region, each of the layers and core disposed substantially concentrically about the cylindrical axis of the fibril. Preferably the entire fibril is substantially free of thermal carbon overcoat. The invention further concerns a plurality of such fibrils.

The fibril or plurality of fibrils of this invention may be produced by contacting for an appropriate period of time and at suitable pressure a suitable metal-containing particle with a suitable gaseous, carbon-containing compound, at a temperature between about 850° C. and 1200° C., the ratio on a dry weight basis of carbon-containing compound to metal containing particle being at least about 100:1.

The fibrils are useful in composites having a matrix of e.g., an organic polymer, an inorganic polymer or a metal. In one embodiment the fibrils are incorporated into structural materials in a method of reinforcement. In other embodiments the fibrils may be used to enhance the electrical or thermal conductivity of a material, to increase the surface area of an electrode or capacitor plate, to provide a support for a catalyst, or to shield an object from electromagnetic radiation.

54 Claims, 5 Drawing Figures

CARBON FIBRILS, METHOD FOR PRODUCING SAME AND COMPOSITIONS CONTAINING SAME

BACKGROUND OF THE INVENTION

This invention relates to the production of graphitic carbon fibrils having high surface area, high Young's modulus of elasticity and high tensile strength. More specifically, it relates to such fibrils grown catalytically from inexpensive, readily available carbon precursors without the need for usual and expensive graphitizing temperatures (approximately 2900° C.).

Fiber-reinforced composite materials are becoming increasingly important because their mechanical properties, notably strength, stiffness and toughness, are superior to the properties of their separate components or of other noncomposite materials. Composites made from carbon fibers excel in strength and stiffness per unit weight, hence are finding rapid acceptance in aerospace and sporting goods applications. Their high cost, however, inhibits their wider use.

Carbon fibers are currently made by controlled pyrolysis of continuous filaments of precursor organic polymers, notably cellulose or polyacrylonitrile, under carefully maintained tension, needed to insure good orientation of the anisotropic sheets of carbon atoms in the final filaments. Their high cost is a consequence of the cost of the preformed organic fibers, the weight loss in carbonization, the slow rate of carbonization in expensive equipment and the careful handling necessary to avoid breaks in the continuous filaments.

There has been intense development of methods of spinning and carbonizing hydrocarbon pitch fiber to reduce precursor filament cost and weight loss. So far, the pitch pretreatment, spinning conditions and post-treatments needed to insure correct orientation of the sheets of carbon atoms in the final products have been nearly as expensive as the previously noted method involving organic polymers. Both methods require use of continuous filaments to achieve high orientation and best properties. There is a practical lower limit of fiber diameter, 6 to 8 micrometers, below which fiber breakage in spinning and post-treatments becomes excessive.

An entirely distinct approach to carbon fiber formation involves the preparation of carbon filaments through the catalytic decomposition at metal surfaces of a variety of carbon containing gases, e.g., $CO/H_2$, hydrocarbons, and acetone. These filaments are found in a wide variety of morphologies (e.g., straight, twisted, helical, branched) and diameters (e.g., ranging from tens of angstroms to tens of microns). Usually, a mixture of filament morphologies is obtained, frequently admixed with other, non-filamentous carbon (cf. Baker and Harris, *Chemistry and Physics of Carbon*, Vol. 14, 1978). Frequently, the originally formed carbon filaments are coated with poorly organized thermal carbon. Only relatively straight filaments possessing relatively large graphitic domains oriented with their c-axes perpendicular to the fiber axis and possessing little or no thermal carbon overcoat will impart the properties of high strength and modulus required in reinforcement applications.

Most reports that cite formation of filamentous carbon do not document the particular type of filaments formed, so that it is impossible to determine whether the filaments are suitable for reinforcement applications. For example, Baker et al., in British Pat. No. 1,499,930 (1977), disclose that carbon filaments are formed when an acetylene or diolefin is decomposed over catalyst particles at 675°–775° C. No description of the structure of these filaments is given, however. In European Patent Application EP No. 56,004 (1982), Tates and Baker describe the formation of filamentous carbon over $FeO_x$ substrates, but again do not disclose any information concerning the structure of the carbon filaments formed. Bennett et al., in United Kingdom Atomic Energy Authority Report AERE-R7407, describe the formation of filamentous carbon from catalytic decomposition of acetone, but also fail to give any indication of the morphology, and hence suitability for reinforcement applications, of the carbon formed.

Several groups of workers have disclosed the formation of straight carbon filaments through catalytic decomposition of hydrocarbons. Oberlin, Endo, and Koyama have reported that aromatic hydrocarbons such as benzene are converted to carbon fibers with metal catalyst particles at temperatures of around 1100° C., Carbon 14:133 (1976). The carbon filaments contain a well ordered, graphitic core of approximately the diameter of a catalyst particle, surrounded by an overcoat of less organized thermal carbon. Final filament diameters are in the range of 0.1 to 80 microns. The authors infer that the graphitic core grows rapidly and catalytically, and that thermal carbon subsequently deposits on it, but state that the two processes cannot be separated "because they are statistically concomitant". Journal of Crystal Growth 32:335 (1976). The native fibers, coated with thermal carbon, possess low strength and stiffness, and are not useful as a reinforcing filler in composites. An additional high temperature treatment at 2500°–3000° C. is necessary to convert the entire filament to highly ordered graphitic carbon. While this procedure may be an improvement on the difficult and costly pyrolysis of preformed organic fibers under tension, it suffers from the drawback that a two step process of fiber growth and high temperature graphitization is required. In addition, the authors state nothing regarding deliberate catalyst preparation, and catalyst particles appear to be adventitious. In more recent work, preparation of catalytic particles is explored, but the two processes of catalytic core growth and thermal carbon deposition are again not separated, Extended Abstracts, 16th Biennial Conference on Carbon: 523 (1983).

Tibbetts has described the formation of straight carbon fibers through pyrolysis of natural gas in type 304 stainless steel tubing at temperatures of 950°–1075° C., *Appl. Phys. Lett.* 42(8):666 (1983). The fibers are reported to grow in two stages similar to those seen by Koyama and Endo, where the fibers first lengthen catalytically and then thicken by pyrolytic deposition of carbon. Tibbetts states that these stages are "overlapping", and is unable to grow filaments free of pyrolytically deposited carbon. In addition, Tibbett's approach is commercially impracticable for at least two reasons. First, initiation of fiber growth occurs only after slow carbonization of the steel tube (typically about ten hours), leading to a low overall rate of fiber production. Second, the reaction tube is consumed in the fiber forming process, making commercial scale-up difficult and expensive.

It has now unexpectedly been found that it is possible to catalytically convert hydrocarbon precursors to carbon filaments substantially free of pyrolytically deposited thermal carbon, and thereby to avoid the thickening stage reported in the prior art as "overlapping" and "concomitant" with the filament lengthening stage. This ability allows the direct formation of high strength fibrils useful in the reinforcement of matrices, in the preparation of electrode materials of very high surface area, and in the shielding of objects from electromagnetic radiation.

SUMMARY OF THE INVENTION

This invention concerns an essentially cylindrical discrete carbon fibril characterized by a substantially constant diameter between about 3.5 and about 70 nanometers, e.g. between about 7 and 25 nanometers, length greater than about $10^2$ times the diameter, an outer region of multiple essentially continous layers of ordered carbon atoms and a distinct inner core region, each of the layers and core disposed substantially concentrically about the cylindrical axis of the fibril. Preferably the entire fibril is substantially free of thermal carbon overcoat.

The inner core of the fibril may be hollow or may contain carbon atoms which are less ordered than the ordered carbon atoms of the outer region, which are graphitic in nature.

The fibril of this invention may be produced by contacting for an appropriate period of time and at a suitable pressure a suitable metal-containing particle with a suitable gaseous, carbon-containing compound, at a temperature between about 850° C. and 1200° C., the ratio on a dry weight basis of carbon-containing compound to metal-containing particle being at least about 100:1.

The contacting of the metal-containing particle with the carbon-containing compound may be carried out in the presence of a compound, e.g. $CO_2$, $H_2$ or $H_2O$, capable of reaction with carbon to produce gasous products.

Suitable carbon-containing compounds include hydrocarbons, including aromatic hydrocarbons, e.g. benzene, toluene, xylene, cumene, ethylbenzene, naphthalene, phenanthrene, anthracene or mixtures thereof; non-aromatic hydrocarbons, e.g., methane, ethane, propane, ethylene, propylene or acetylene or mixtures thereof; and oxygen-containing hydrocarbons, e.g. formaldehyde, acetaldehyde, acetone, methanol, or ethanol or mixtures thereof; and include carbon monoxide.

The suitable metal-containing particle may be an iron-, cobalt-, or nickel-containing particle having a diameter between about 3.5 and about 70 nanometers.

Such particles may be supported on a chemically compatible, refractory support, e.g., a support of alumina, carbon, or a silicate, including an aluminum silicate.

In one embodiment the surface of the metal-containing particle is independently heated, e.g. by electromagnetic radiation, to a temperature between about 850° C. and 1800° C., the temperature of the particle being higher than the temperature of the gaseous, carbon-containing compound.

In a specific embodiment, the metal-containing particle is contacted with the carbon-containing compound for a period of time from about 10 seconds to about 180 minutes at a pressure of from about one-tenth atmosphere to about ten atmospheres. In this embodiment, the metal-containing particle is an iron-containing particle, the gaseous carbon-containing compound is benzene, the reaction temperature is between 900° C. and 1150° C. and the ratio of carbon-containing compound to metal-containing particle is greater than about 1000:1. The contacting may be carried out in the presence of gaseous hydrogen. Additionally, the iron-containing particle may be supported on a chemically compatible, refractory support of, e.g., alumina or carbon.

In addition to the above-mentioned method and carbon fibril produced thereby this invention also concerns a method for producing a substantially uniform plurality of essentially cylindrical, discrete carbon fibrils which comprises contacting for an appropriate period of time and at a suitable pressure, suitable metal-containing particles with a suitable gaseous, carbon-containing compund, at a temperature between about 850° C. and 1200° C., the ratio on a dry weight basis of carbon-containing compound to metal-containing particles being at least about 100:1. Preferably, each of the fibrils so produced has a diameter substantially equal to the diameter of each other fibril. In one embodiment the metal-containing particles are pre-formed.

The fibrils are useful in composites having a matrix of e.g., an organic polymer, an inorganic polymer or a metal. In one embodiment the fibrils are incorporated into structural materials in a method of reinforcement. In other embodiments the fibrils may be used to enhance the electrical or thermal conductivity of a material, to increase the surface area of an electrode or an electrolytic capacitor plate, to provide a support for a catalyst, or to shield an object from electromagnetic radiation.

DETAILED DESCRIPTION OF THE INVENTION

An essentially cylindrical carbon fibril may be produced in accordance with this invention, said fibril being characterized by a substantially constant diameter between about 3.5 and about 70 nanometers, a length greater than about $10^2$ times the diameter, an outer region of multiple layers of ordered carbon atoms and a distinct inner core region, each of the layers and core disposed concentrically about the cylindrical axis of the fibril. Preferably the entire fibril is substantially free of thermal carbon overcoat. The term "cylindrical" is used herein in the broad geometrical sense, i.e., the surface traced by a straight line moving parallel to a fixed straight line and intersecting a curve. A circle or an ellipse are but two of the many possible curves of the cylinder.

The inner core region of the fibril may be hollow, or may comprise carbon atoms which are less ordered than the ordered carbon atoms of the outer region. "Ordered carbon atoms," as the phrase is used herein means graphitic domains having their c-axes substantially perpendicular to the cylindrical axis of the fibril.

In one embodiment, the length of the fibril is greater than about $10^3$ times the diameter of the fibril. In another embodiment, the length of the fibril is greater than about $10^4$ times the fibril diameter. In one embodiment, the fibril diameter is between about 7 and about 25 nanometers. In another embodiment the inner core region has a diameter greater than about 2 nanometers.

More specifically, a method for producing an essentially cylindrical, discrete carbon fibril according to this invention comprises contacting for an appropriate period of time and at a suitable pressure a catalyst, i.e., a suitable, discrete metal-containing particle, with a suitable precursor, i.e., a suitable gaseous, carbon-containing compound, at a temperature between about 850° C. and about 1200° C. The ratio on a dry weight basis of carbon-containing compound (precursor) to metal-containing particle (catalyst) is suitably at least about 100:1.

It is contemplated that a variety of carbon-containing compounds are suitable as precursors when used with an appropriate combination of reaction parameters, in accordance with this invention. In one embodiment, exemplified herein, the precursor is benzene. Other contemplated suitable precursors include hydrocarbons and carbon monoxide. The hydrocarbon precursor may be aromatic, e.g. benzene (exemplified herein), toluene, xylene, cumene, ethylbenzene, naphthalene, phenanthrene, anthracene or mixtures thereof. Alternatively, the hydrocarbon may be non-aromatic, e.g. methane, ethane, propane, ethylene, propylene or acetylene or mixtures thereof. The hydrocarbon may also contain oxygen, e.g. alcohols such as methanol or ethanol, ketones such as acetone, and aldehydes such as formaldehyde or acetaldehyde or mixtures thereof.

Important reaction parameters, in addition to the particular precursor, include catalyst composition and pretreatment, catalyst support, precursor temperature, catalyst temperature, reaction pressure, residence time or growth time, and feed composition, including the presence and concentrations of any diluents (e.g., Ar) or compounds capable of reaction with carbon to produce gaseous products (e.g., $CO_2$, $H_2$, or $H_2O$). It is contemplated that the reaction parameters are highly interdependent, and that the appropriate combination of reaction parameters will depend on the specific precursor carbon-containing compound.

It is further contemplated that a variety of transition metal-containing particles are suitable as catalysts when used with an appropriate combination of reaction parameters. In a presently preferred embodiment, the metal-containing particle comprises a particle having a diameter between about 3.5 and about 70 nanometers and contains iron, cobalt or nickel, or an alloy or mixture thereof.

In one embodiment, the metal-containing particle is contacted with the carbon-containing compound in the presence of a compound capable of reaction with carbon to produce gaseous products. In one such embodiment, the compound capable of reacting with carbon is $CO_2$, $H_2$, or $H_2O$.

It is desirable that catalyst particles be of reasonably uniform diameter and that they be isolated from one another, or at least held together in only weakly bonded aggregates. The particles need not be in an active form before they enter the reactor, so long as they are readily activated through a suitable pretreatment or under reaction conditions. The choice of a particular series of pretreatment conditions depends on the specific catalyst and carbon-containing compound used, and may also depend on other reaction parameters outlined above. Exemplary pretreatment conditions are provided in the Examples which follow. The metal-containing particles may be precipitated as metal oxides, hydroxides, carbonates, carboxylates, nitrates, etc., for optimum physical form. Well-known colloidal techniques for precipitating and stabilizing uniform, very small particles are applicable. For example, the techniques described by Spiro et al. for precipitating hydrated ferric oxide into easily dispersable uniform spheres a few nanometers in diameter, are very suitable for catalyst preparation, J. Am. Chem. Soc. 88 (12):2721–2726(1966); 89(22):5555–5559 and 5559–5562(1967). These catalyst particles may be deposited on chemically compatible, refractory supports. Such supports must remain solid under reaction conditions, must not poison the catalyst, and must be easily separated from the product fibrils after they are formed. Alumina, carbon, quartz, silicates, and aluminum silicates such as mullite are all suitable support materials. For ease of removal, their preferred physical form is thin films or plates which can easily be moved into and out of the reactor.

Small metal particles may also be formed by thermolysis of metal-containing vapor in the reactor itself. For example, iron particles may be formed from ferrocene vapor. This method has the advantage that fibril growth is initiated throughout the reactor volume, giving higher productivity than when the catalyst particles are introduced on supports.

The reaction temperature must be high enough to cause the catalyst particles to be active for fibril formation, yet low enough to avoid significant thermal decomposition of the gaseous carbon-containing compound with formation of pyrolytic carbon. The precise temperature limits will depend on the specific catalyst system and gaseous carbon-containing compound used. For example, benzene is kinetically thermally stable to about 1100° C., methane to about 950° C., and acetylene to about 500° C. In cases where thermal decomposition of the gaseous carbon-containing compound occurs at a temperature near or below that required for an active, fibril-producing catalyst, the catalyst particle may be heated selectively to a temperature greater than that of the gaseous carbon-containing compound. Such selective heating may be achieved, for example, by electromagnetic radiation.

The carbon fibril of this invention may be produced at any desirable pressure, and the optimum pressure will be dictated by economic considerations. Preferably, the reaction pressure is between one-tength and ten atmospheres. More preferably, the reaction pressure is atmospheric pressure.

In one exemplified embodiment, the fibril is produced by contacting for about 180 minutes and at a pressure of about one atmosphere, a suitable iron-containing particle with benzene (gaseous) in an approximately 9:1 hydrogen-benzene mixture at a temperature of about 900° C., the ratio on a dry weight basis of carbon-containing compound to iron-containing particle being greater than about 1000:1 . In another exemplified embodiment the fibril is produced by contacted for from about one to about five minutes and at a pressure of about one atmosphere, a suitable iron-containing particle with benzene (gaseous) in an approximately 9:1 hydrogen:benzene mixture at a temperature of about 1100° C., the ratio of a dry weight baseis of carbon-containing compound to iron-containing particle being greater than about 1000:1. In a preferred embodiment of this method, the iron-containing particle is supported on a chemically compatible, refractory support, as previously described. Preferably such refractory support is alumina.

Fibrils made according to this invention are highly graphitic as grown. The individual graphitic carbon layers are concentrically arranged around the long axis of the fiber like the growth rings of a tree, or like a scroll of hexagonal chicken wire. There is usually a hollow core a few nanometers in diameter, which may be partially or wholly filled with less organized carbon. Each carbon layer around the core may extend as much as several hundred nanometers. The spacing between adjacent layers may be determined by high resolution electron microscopy, and should be only slightly greater than the spacing observed in single crystal graphite, i.e., about 0.339 to 0.348 nanometers.

There are no methods for direct measurement of the physical properaties of such small fibrils. However, the stiffness of composites containing the fibrils are those expected from the Young's moduli which have been measured on larger, well graphitized carbons.

Another aspect of this invention concerns a method for producing a substantially uniform plurality of essentially cylindrical, discrete carbon fibrils. The plurality of fibrils is substantially uniform in the sense that the diameter of each fibril is substantially equal to the diameter of each other fibril. Preferably each of the fibrils is substantially free of thermally deposited carbon. The method for producing such a plurality involves contacting for an appropriate period of time and at a suitable pressure, suitable metal-containing particles, with a suitable gaseous carbon-containing compound as previously discussed, at a temperature between about 850° C. and 1200° C., the ratio on a dry weight basis of carbon-containing compound to metal-containing particle being at least about 100:1. By this method a substantially uniform plurality of fibrils, e.g. each having a diameter substantially equal to the diameter of each other fibril, may be obtained.

Another aspect of this invention concerns a composite which comprises carbon fibrils as described above, including composites serving as structural materials. Such as composite may also comprise a matrix of pyrolytic or non-pyrolytic carbon or an organic polymer such as a polyamide, polyester, polyether, polyimide, polyphenylene, polysulfone, polyurethane or epoxy resin, for example. Preferred embodiments include elastomers, thermoplastics and thermosets.

In another embodiment, the matrix of the composite is an inorganic polymer, e.g. a ceramic material or polymeric inorganic oxide such as glass. Preferred embodiments include fiberglass, plate glass and other molded glass, silicate ceramics, and other refractory ceramics such as aluminum oxide, silicon carbide, silicon nitride and boron nitride.

In still another embodiment the matrix of the composite is a metal. Suitable metals include aluminum, magnesium, lead, copper, tungsten, titanium, niobium, hafnium, vandium, and alloys and mixtures thereof.

The carbon fibrils are also useful in various other applications. One embodiment is a method for increasing the surface are of an electrode or electrolytic capacitor plate by attaching thereto one or more carbon fibrils of this invention. In another embodiment the fibril can be used in a method for supporting a catalyst which comprises attaching a catalyst to the fibril. Such catalyst may be an electrochemical catalyst.

The carbon fibrils are also useful in a method of enhancing the electrical conductivity of a material. According to this method an effective electrical conductivity enhancing amount of carbon fibrils is incorporated in the material.

A further use of the carbon fibrils is in a method of enhancing the thermal conductivity of a material. In this method an effective thermal conductivity enhancing amount of carbon fibrils is incorporated in the material.

An additional use of the carbon fibrils is in a method of shielding an object from electromagnetic radiation. In this method an effective shielding amount of carbon fibrils is incorporated in the object.

This invention is illustrated in the examples which follow. The examples are set forth to aid in an understanding of the invention but are not intended to, and should not be construed to, limit in any way the invention as set forth in the claims which follow thereafter.

EXAMPLES

Materials

The following materials used in the examples below may be obtained from commercial sources: Benzene (reagent grade), $Fe(NO_3)_3.9H_2O$ (Baker Analyzed Crystal), $FeSO_4.7H_2O$ (Baker Analyzed Granular), $KNO_3$ (Baker Analyzed Crystal) and $NaHCO_3$ (Baker Analyzed Crystal) may all be obtained from J. T. Baker Chemical Company, Phillipsburg, N.J. CO (C.P. Grade) may be obtained from Air Products and Chemicals, Inc., Allentown, Pa. KOH (C.P. Pellets) may be obtained from Mallinckrodt Inc., Lodi, N.J. Water used in the examples was deionized. Vycor ® glass tubes may be obtained from Corning Glass Works, Corning, N.Y.

Davison SMR-37-1354 SRA alumina is an α-boehmite with an average crystallite size of 15 angstroms, an average agglomerate size of 0.2 microns, and an average particle size of 15 microns.

Degussa Aluminum Oxid C is a γ-alumina with a surface area of 100 $m^2/g$, an average particle size of 200 angstroms, and an apparent bulk density of 60 g/L.

Cabot Sterling R V-9348 carbon powder is a furnace black with a minimum carbon content of 99.5%, a surface area of 25 $m^2/g$, an average particle size of 750 angstroms, and an apparent density of 16 $lb/ft^3$.

Analyses

All electron micrographs were obtained from a Zeiss EM-10 Electron Microscope.

Catalyst Preparations

Example 1: Preparation of Catalyst 1

Figure 1:
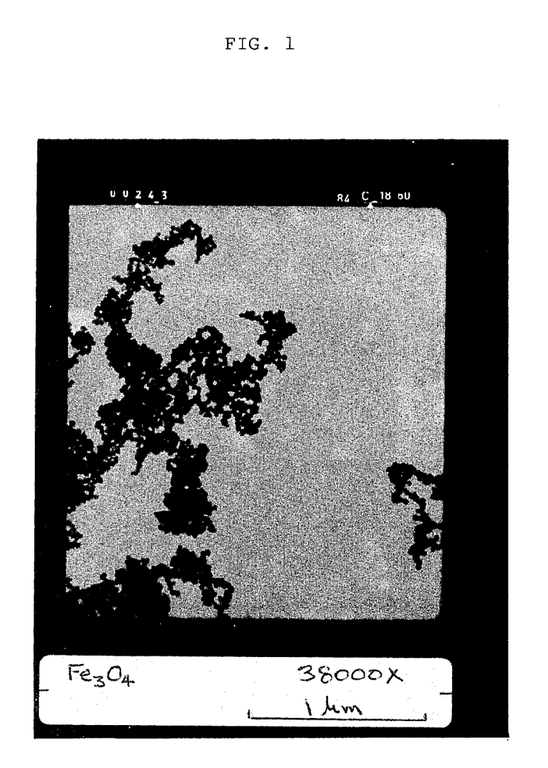
FIG. 1. A dispersion of catalyst particles comprised of $Fe_3O_4$.
Figure 2:
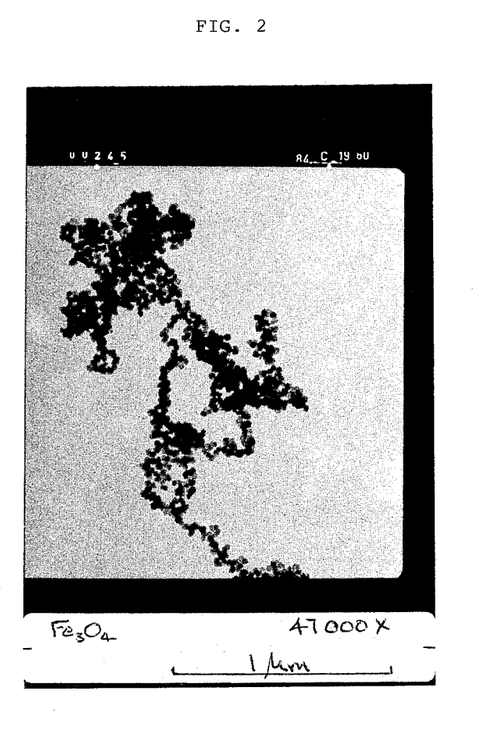
FIG. 2. A dispersion of catalyst particles comprised of $Fe_3O_4$.

A magnetite dispersion was prepared according to the method of Sugimoto and Matijevic, J. Colloid & Interfacial Sci. 74:227 (1980). Electron microscopy reveals the particle size range to be from 175 to 400 angstroms, with 260 angstroms being the approximate average (FIGS. 1 and 2).

Example 2: Preparation of Catalyst 2

Into a 4 oz wide-mouth glass jar with a magnetic stirring bar was placed 10 g Davison SMR-37-1534 SRA alumina powder. To the stirred powder 0.81M $Fe(NO_3)_3$ in $H_2O$ was added dropwise to the point of incipient wetness. 4.1 mL was required.

Example 3: Preparation of Catalyst 3

A portion of the wet powder obtained in Example 2 was heated in the jar with stirring on a hot plate until dry. The temperature was kept below that at which $NO_x$ evolved.

Example 4: Preparation of Catalyst 4

A portion of Davison SMR-37-1534 SRA alumina powder was calcined in an air stream at 900° C. for 90 min in a Vycor ® tube. In a 4 oz wide-mouth jar with magnetic stirring bar was placed 1.9977 g of the calcined $Al_2O_3$. While it was being stirred, 0.81M $Fe(NO_3)_3$ solution in $H_2O$ was added dropwise to incipient wetness. 0.6 mL was required. The wet powder was dried with stirring on a hot plate.

Example 5: Preparation of Catalyst 5

Into a 4 in cappable serum polymerization tube was weighed 0.44 g Degussa Aluminum Oxid C (fumed $Al_2O_3$). The tube was capped and argon sparged, after which 1 mL 0.5M KOH, 1 mL 2.0M $KNO_3$, and 6 mL prefiltered deionized water were injected. The mixture was argon sparged 5 min, then 2.0 mL 0.101M $FeSO_4$ was injected. The mixture was sparged with argon for 1 min. The tube was placed in a 90° oil bath and the argon sparge continued for 5 min. Sparging was discontinued and quiescent digestion begun. (The oil bath temperature control was faulty, and temperature rose to 105° C. The bath was cooled back to 90° C.) Total digestion time was 2 h.

The system on standing separated into a white precipitate and clear supernate. It was centrifuged, the supernate decanted, the precipitate resuspended in prefiltered, deionized water. This was repeated two more times. The pH of the final supernate was approximately 8.5. The water was decanted, the precipitate blown semi-dry with argon, and resuspended in ethanol.

Example 6: Preparation of Catalyst 6

A portion of Davison SMR-37-1534 SRA alumina powder was calcined 2 h in an air stream at 900° C. in a Vycor ® tube. One gram of the product was placed in a cappable 4-in polymerization tube and enough 1.6M $Fe(NO_3)_3$ solution was added to cover the alumina completely. The tube was capped and evacuated until bubbling ceased. It was vented and the excess liquid filtered off through an M glass fritted filter. The moist cake was calcined in a ceramic boat for 1 h in an air stream at 500° C.

Example 7: Preparation of Catalyst 7

In a centrifuge bottle 6.06 g $Fe(NO_3)_3.9H_2O$ was dissolved in 50 mL prefiltered deionized $H_2O$. To the solution was added 2.52 g $NaHCO_3$. When foaming ceased, the solution was sparged 5 min with argon. The product $Fe_2O_3$ sol was a clear solution.

A portion of Cabot Sterling R V-9348 carbon powder was calcined in an argon stream in a Vycor ® boat in a mullite tube at 1100° C. for 1 h. It was cooled to room temperature under argon. Into a 4-in polymerization tube enough carbon was placed to make about 0.25 in layer. The tube was evacuated and 2 mL $Fe_2O_3$ solution was added. When bubbling ceased, the tube was vented and the suspension filtered on an M-glass fritted funnel. The cake was air-dried and heated for 1 h at 500° C. under an argon stream in a Vycor ® tube.

Example 8: Preparation of Catalyst 8

In a 4-in polymerization tube a 0.4876 g portion of calcined Cabot Sterling R V-9348 carbon powder was evacuated and 2.0 mL 0.81 M $Fe(NO_3)_3$ solution was added. When bubbling ceased, the tube was vented and the cake air-dried.

Example 9: Preparation of Catalyst 9

A pellet was made by compressing Cabolt Sterling R V-9348 powder in a stainless die (for making KBR discs for infra-red). 0.12 g of the pellet was evacuated in a 4-in polymerization tube and 0.05 mL of a freshly-prepared $Fe_2O_3$ sol (prepared as in Example 7) was added. The tube was vented and the solid was air-dried.

Example 10: Preparation of Catalyst 10

In a 4-in polymerization tube, 0.23 g of Davison SMR-37-1534 SRA alumina which had been calcined 2 h at 900° C. in air was evacuated and 2.0 mL freshly prepared $Fe_2O_3$ sol (prepared as in Example 7) was added. The tube was vented and the solid filtered out on an M-glass fritted filter. The cake was air-dried.

Fibril Synthesis Runs

EXAMPLES 11–33

Examples 11–33 describe fibril synthesis runs. Table 1 summarizes experimental conditions and results. Unless otherwise stated, the fibril precursor was benzene as an approximately 9:1 hydrogen-benzene mixture, and gas flow rates were 300 mL/min for $H_2$ and Ar; 300 mL/min CO and 100 mL/min $H_2$ for $CO/H_2$; 300 mL/min Ar or $H_2$ through benzene at 20° C. for $Ar/C_6H_6$ or $H_2/C_6H_6$ (approximately 9:1 volume ratio Ar or $H_2/C_6H_6$). Air and hydrogen were always separated by a brief argon purge of the reactor. Experimental protocols were similar in each run, and are described in detail for Examples 11, 15 and 28.

(a) Example 11

Catalyst prepared according to the method of Example 1 was ultrasonically dispersed in water and transferred to a ceramic boat. The boat was placed in the center of a 1" Vycor ® tube in an electric furnace at room temperature. The catalyst was brought from room temperature to 500° C. over a 15 minute period under a flow of argon. At this temperature, the gas mixture was changed to a hydrogen:benzene (9:1) mixture. This composition was fed into the reactor for 60 minutes.

Figure 3:
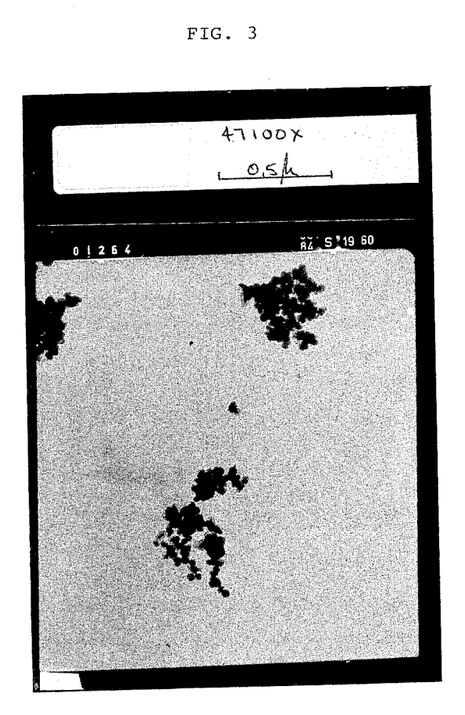
FIG. 3. Catalyst particles encapsulated in 50–150 angstrom carbon sheaths.

The hydrogen flow was terminated and replaced by argon, and the reactor cooled to room temperature. The boat was removed from the tube and a quantity of carbon was scraped from it. This carbon was ultrasonically dispersed in ethanol and a 10 microliter sample was examined by electron microscopy. The micrographs revealed that most of the iron particles were encapsulated in 50 to 150 angstrom carbon sheaths (FIG. 3).

(b) Example 15

Catalyst prepared as in Example 2 was dispersed in a ceramic boat. The boat was placed in a 1" Vycor ® tube in the same electric furnace as used in Example 11.

The furnace temperature was raised from room temperature to 500° C. and maintained at 500° C. for 60 minutes under air. The reactor was briefly purged with argon. The temperature was then raised from 500° C. to 900° C. over a 15 minute period under hydrogen and maintained at 900° for 60 minutes under that hydrogen flow.

Figure 4:
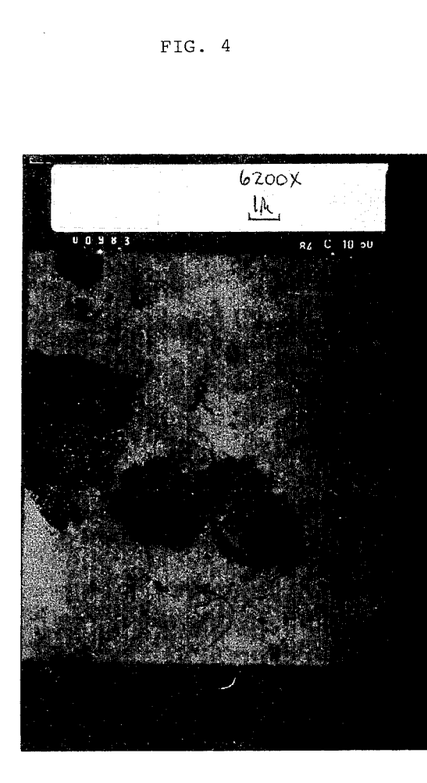
FIG. 4. Numerous 100–450 angstrom diameter fibrils, together with catalyst support and reaction debris.

Gas flow was then switched to benzene-saturated hydrogen for 180 minutes at 900° C. After cooling to room temperature under argon a sample was prepared according to the procedure of Example 11, and examined by electron microscopy. Electron micrographs revealed numerous 100–450 angstrom diameter fibrils (FIG. 4).

(c) Example 28

Catalyst prepared as in Example 3 was dispersed in a ceramic boat. The boat was placed in a 1" mullite tube in the same electric furnace as used in Example 11.

The furnace temperature was raised from room temperature to 500° C. over 15 minutes and maintained at 500° C. for 60 minutes under air. The reactor was briefly purged with argon. The temperature was then raised from 500° C. to 900° C. over a 20 minute period under hydrogen and maintained at 900° C. for 60 minutes under that hydrogen flow. The temperature was then raised still further to 1100° C. over a 20 minute period maintaining the same hydrogen flow.

Figure 5:
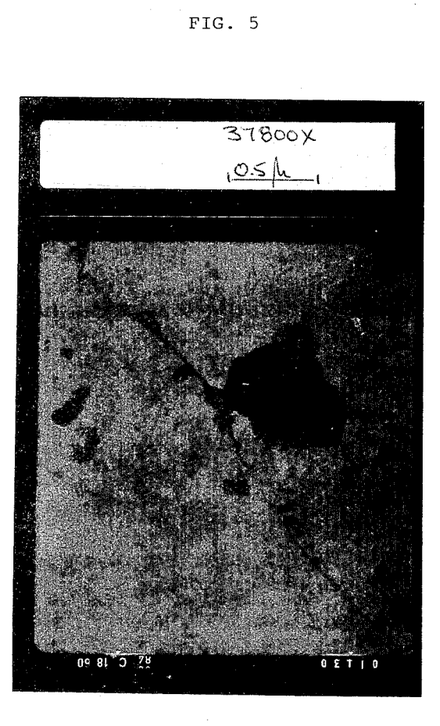
FIG. 5. A fibril with a diameter of approximately 250 angstroms, together with catalyst support and reaction debris.

Gas flow was then switched to benzene saturated hydrogen for 5 minutes at 1100° C. After cooling to room temperature under argon a sample was prepared according to the procedure of Example 11, and examined by electron microscopy. Electron micrographs revealed fibrils ranging in diameter from 30 to 300 angstroms (FIG. 5).

TABLE 1

Fibril Synthesis Runs

| Example No. | Growth Temp. (°C.) | Catalyst No. | Growth Time (min) | Pretreatment Conditions | Fibrils Yes | Fibrils No |
|---|---|---|---|---|---|---|
| 11 | 500 | 1 | 60 | 25–500° in 15 min (Ar) | | N |
| 12 | 750 | 1[1] | 420 | 23–750° in 40 min (Ar) | | N |
| 13 | 800 | 3 | 15 | 22–500° in 15 min (air) | | N |
| | | | | 500° for 60 min (air) | | |
| | | | | 500–900° in 15 min (H$_2$) | | |
| | | | | 900° for 60 min (H$_2$) | | |
| | | | | 900–800° in 11 min (H$_2$) | | |
| 14 | 900 | 1[2] | 180 | 26–350° in 20 min (H$_2$) | Y | |
| | | | | 350° for 15 min (H$_2$) | | |
| | | | | 350–400° in 10 min (CO/H$_2$) | | |
| | | | | 400° for 210 min (CO/H$_2$) | | |
| | | | | 400–900° in 26 min (Ar) | | |
| 15 | 900 | 2 | 180 | 500° for 60 min (air) | Y | |
| | | | | 500–900° in 15 min (H$_2$) | | |
| | | | | 900° for 60 min (H$_2$) | | |
| 16 | 900 | 4 | 180 | 24–900° in 35 min (Ar) | Y | |
| | | | | 900° for 60 min (H$_2$) | | |
| 17 | 900 | 3 | 15 | 80–500° in 15 min (air) | | N |
| | | | | 500° for 60 min (air) | | |
| | | | | 500–900° in 15 min (H$_2$) | | |
| | | | | 900 for 60 min (H$_2$) | | |
| 18 | 900 | 3 | 60 | 22–500° in 15 min (air) | | N |
| | | | | 500° for 60 min (air) | | |
| | | | | 500–750° in 10 min (H$_2$) | | |
| | | | | 750° for 70 min (H$_2$) | | |
| | | | | 750–500° in 15 min (H$_2$) | | |
| | | | | 500° for 60 min (Ar/C$_6$H$_6$) | | |
| | | | | 500° for 90 min (H$_2$) | | |
| | | | | 500–900° in 20 min (H$_2$) | | |
| 19 | 900 | 9 | 60 | 90–900° in 30 min (H$_2$) | | N |
| | | | | 900° for 60 min (H$_2$) | | |
| | | | | 900° for 25 min (Ar) | | |
| 20 | 900 | 1 | 60 | 26–900° in 25 min (Ar) | | N |
| 21 | 900 | 1 | 5 | 220–900° in 20 min (Ar) | | N |
| 22 | 1000 | 1 | 5 | 252–1000° in 30 min (Ar) | | N |
| 23 | 1000 | 1 | 120 | 31–1000° in 85 min (H$_2$/C$_6$H$_6$) | | N |
| 24 | 1100 | 5 | 5 | 24–5000° in 15 min (Ar) | | N |
| | | | | 500–900° in 15 min (H$_2$) | | |
| | | | | 900° for 60 min (H$_2$) | | |
| | | | | 900–1100° in 15 min (H$_2$) | | |
| 25 | 1100 | 10 | 1 | 24–500° in 55 min (air) | | N |
| | | | | 500° for 60 min (air) | | |
| | | | | 500–1100° in 30 min (H$_2$) | | |
| | | | | 100° for 30 min (H$_2$) | | |
| 26 | 1100 | 9 | 1 | 140–500° in 10 min (Ar) | | N |
| | | | | 500° for 60 min (Ar) | | |
| | | | | 500–1100° in 26 min (H$_2$) | | |
| | | | | 1100° for 60 min (H$_2$) | | |
| 27[3] | 1100 | 5 | 5 | 25–500° in 20 min (Ar) | | N |
| | | | | 500–900° in 20 min (H$_2$) | | |
| | | | | 900° for 60 min (H$_2$) | | |
| | | | | 900–1100° in 15 min (H$_2$) | | |
| 28 | 1100 | 3 | 5 | 25–500° in 15 min (air) | Y | |
| | | | | 500° for 60 min (air) | | |
| | | | | 500–900° in 20 min (H$_2$) | | |
| | | | | 900° for 60 min (H$_2$) | | |
| | | | | 900–1100° in 20 min (H$_2$) | | |
| 29 | 1100 | 3 | 1 | 85–500° in 10 min (air) | Y | |
| | | | | 500° for 60 min (air) | | |
| | | | | 500–900° in 20 min (H$_2$) | | |
| | | | | 900° for 60 min (H$_2$) | | |
| | | | | 900–1100° in 10 min (H$_2$) | | |
| 30 | 1100 | 6 | 5 | 42–500° in 15 min (Ar) | Y | |
| | | | | 500–900° in 15 min (H$_2$) | | |
| | | | | 900° for 60 min (H$_2$) | | |
| | | | | 900–1100° in 15 min (H$_2$) | | |

TABLE 1-continued

Fibril Synthesis Runs

| Example No. | Growth Temp. (°C.) | Catalyst No. | Growth Time (min) | Pretreatment Conditions | Fibrils Yes | Fibrils No |
|---|---|---|---|---|---|---|
| 31 | 1100 | 3 | 5 | 26–500° in 20 min (air)<br>500° for 60 min (air)<br>500–750° in 10 min ($H_2$)<br>750° for 60 min ($H_2$)<br>750–500° in 10 min ($H_2$)<br>500° for 60 min (Ar/$C_6H_6$)<br>500° for 90 min ($H_2$)<br>500–1100° in 30 min (Ar) | Y | |
| 32 | 1150 | 8 | 1 | 98–500° in 20 min (Ar)<br>500° for 60 min (Ar)<br>500–750° in 10 min ($H_2$)<br>750° for 30 min ($H_2$)<br>750–1150° in 20 min (Ar)<br>1150° for 15 min (Ar) | | N |
| 33 | 1150 | 7 | 1 | 30–1150° in 45 min ($H_2$)<br>1150° for 15 min ($H_2$) | | N |

Footnotes to Table 1
[1] Catalyst 1 was heated from 27° to 350° in 10 min under $H_2$, from 350° to 500° in 30 min under CO/$H_2$, held at 500° for 240 min under CO/$H_2$, and cooled to room temperature prior to use.
[2] Catalyst 1 was supported on a carbon fiber.
[3] Feed was approximately 18:1 $H_2$:$C_6H_6$.

What is claimed is:

1. An essentially cylindrical discrete carbon fibril characterized by a substantially constant diameter between about 3.5 and about 70 nanometers, length greater than about $10^2$ times the diameter, an outer region of multiple essentially continuous layers of ordered carbon atoms and a distinct inner core region, each of the layers and core disposed substantially concentrically about the cylindrical axis of the fibril.

2. A fibril of claim 1, wherein the core is hollow.

3. A fibril of claim 1, wherein the inner core region comprises carbon atoms which are less ordered than the ordered carbon atoms of the outer region.

4. A fibril of claim 1, wherein the ordered carbon atoms are graphitic.

5. A fibril of claim 1, wherein the length is greater than about $10^3$ times the diameter.

6. A fibrile of claim 1, wherein the length is greater than about $10^4$ times the diameter.

7. A fibril of claim 1, wherein the diameter is between about 7 and 25 nanometers.

8. A fibril of claim 1, wherein the inner core region has a diameter greater than about 2 nanometers.

9. A plurality of essentially discrete carbon fibrils characterized by a substantially constant diameter between about 3.5 and about 70 nanometers, length greater than about $10^2$ times the diameter, an outer region of multiple essentially continuous layers of ordered carbon atoms and a distinct inner core region, each of the layers and core disposed substantially concentrically about the cylindrical axis of the fibrils.

10. A method for producing an essentially cylindrical, carbon fibril which comprises contacting for an appropriate period of time and at a suitable pressure a suitable metal-containing particle with a suitable gaseous, carbon-containing compound, at a temperature between about 850° C. and about 1200° C., the ratio on a dry weight basis of carbon-containing compound to metal-containing particle being at least about 100:1.

11. A method according to claim 10, wherein the contacting of metal-containing particle with carbon-containing compound is carried out in the presence of a compound capable of reaction with carbon to produce gaseous products.

12. A method according to claim 11, wherein the compound capable of reacting with carbon is $CO_2$, $H_2$ or $H_2O$.

13. A method according to claim 10, wherein the carbon-containing compound is carbon monoxide.

14. A method according to claim 10, wherein the carbon-containing compound is a hydrocarbon.

15. A method according to claim 14, wherein the hydrocarbon contains oxygen.

16. A method according to claim 15, wherein the oxygen containing hydrocarbon is formaldehyde, acetaldehyde, acetone, methanol, ethanol, or mixtures thereof.

17. A method according to claim 14, wherein the hydrocarbon is aromatic.

18. A method according to claim 17, wherein the aromatic hydrocarbon is benzene, toluene, xylene, cumene, ethylbenzene, naphthalene, phenanthrene, anthracene or mixtures thereof.

19. A method according to claim 14, wherein the hydrocarbon is non-aromatic.

20. A method according to claim 19, wherein the hydrocarbon is methane, ethane, propane, ethylene, propylene or acetylene or mixtures thereof.

21. A method according to claim 10, wherein the metal-containing particle comprises an iron-, cobalt-, or nickel-containing particle having a diameter between about 3.5 and about 70 nanometers.

22. A method according to claim 10, wherein the metal-containing particle is supported on a chemically compatible, refractory support.

23. A method according to claim 22, wherein the support is alumina.

24. A method according to claim 22, wherein the support is carbon.

25. A method according to claim 22, wherein the support is a silicate.

26. A method according to claim 25, wherein the silicate is an aluminum silicate.

27. A method according to claim 10, wherein the period of time is from about 10 seconds to about 180 minutes, the pressure is from about one-tenth atmosphere to about ten atmospheres, the metal-containing particle is an iron-containing particle, the carbon-containing compound is benzene, the temperature is from about 900° C. to about 1150° C., and the ratio on a dry weight basis of benzene to iron-containing particle is at least about 1000:1.

28. A method according to claim 27, wherein the period of time is about 180 minutes, the pressure is about one atmosphere, the carbon-containing compound is benzene in an approximately 9:1 volume mixture of hydrogen:benzene, and the temperature is about 900° C.

29. A method according to claim 27, wherein the period of time is from about one to about five minutes, the pressure is about one atmosphere, the carbon-containing compound is benzene in an approximately 9:1 volume mixture of hydrogen:benzene, and the temperature is about 1100° C.

30. A method according to claim 27, wherein the iron-containing particle is supported on a chemically compatible, refractory support.

31. A method according to claim 30, wherein the refractory support is alumina or carbon.

32. A method for producing an essentially cylindrical carbon fibril which comprises contacting for a period of time from about 10 seconds to about 180 minutes and at a pressure of from about one-tenth atmosphere to about ten atmospheres a suitable iron-containing particle with gaseous benzene at a temperature between about 900° C. and about 1150° C., the ratio on a dry weight basis of benzene to iron-containing particle being at least about 1000:1.

33. A method according to claim 32, wherein the period of time is about 180 minutes, the pressure is about one atmosphere, the benzene is in an approximately 9:1 volume mixture of hydrogen:benzene, and the temperature is about 900° C.

34. A method according to claim 32, wherein the period of time is from about one to about five minutes, the pressure is about one atmosphere, the benzene is in an approximately 9:1 volume mixture of hydrogen:benzene, and the temperature is about 1100° C.

35. A method according to claim 32, wherein the iron-containing particle is supported on a chemically compatible, refractory support.

36. A method according to claim 35, wherein the refractory support is alumina or carbon.

37. A method for producing an essentially cylindrical carbon fibril which comprises contacting for an appropriate period of time and at a suitable pressure a suitable metal-containing particle with a suitable gaseous, carbon-containing compound, wherein the metal-containing particle is independently heated to a temperature between about 850° C. and about 1800° C., the temperature of the particle being higher than the temperature of the gaseous, carbon-containing compound.

38. A method according to claim 37, wherein the particle is heated with electromagnetic radiation.

39. A carbon fibril produced according to the method of claim 10.

40. A method for producing a substantially uniform plurality of essentially cylindrical, discrete carbon fibrils which comprises contacting for an appropriate period of time and at a suitable pressure, suitable metal-containing particles with a suitable gaseous carbon-containing compound, at a temperature between about 850° C. and 1200° C., the ratio on a dry weight basis of carbon-containing compound to metal-containing particles being at least about 100:1.

41. A method of claim 40, wherein each of the fibrils has a diameter substantially equal to the diameter of each other fibril.

42. A method of claim 40, wherein the metal-containing particles ae pre-formed.

43. A substantially uniform plurality of carbon fibrils produced according to the method of claim 40.

44. A composite which comprises a plurality of carbon fibrils according to claim 1, 9, 39 or 43.

45. A composite according to claim 44 which comprises a matrix of an organic polymer.

46. A composite according to claim 44 which comprises a matrix of an inorganic polymer.

47. A composite according to claim 44 which comprises a matrix of a metal.

48. A method of reinforcing a structural material which comprises incorporating therein an effective reinforcing amount of carbon fibrils according to claim 1, 9, 39 or 43.

49. A method of enhancing the electrical conductivity of a material which comprises incorporating therein an effective electrical conductivity-enhancing amount of carbon fibrils according to claim 1, 9, 39 or 43.

50. A method of enhancing the thermal conductivity of a material which comprises incorporating therein an effective thermal conductivity-enhancing amount of carbon fibrils according to claim 1, 9, 39 or 43.

51. A method of increasing the surface area of an electrode or an electrolytic capacitor plate which comprises attaching thereto one or more fibrils according to claim 1, 9, 39 or 43.

52. A method of supporting a catalyst which comprises attaching a catalyst to a fibril according to claim 1, 9, 39 or 43.

53. A method according to claim 52, wherein the catalyst is an electrochemical catalyst.

54. A method of shielding an object from electromagnetic radiation which comprises incorporating therein an effective shielding amount of carbon fibrils according to claim 1, 9, 39 or 43.

* * * * *